(12) United States Patent
Moore, III

(10) Patent No.: US 6,207,059 B1
(45) Date of Patent: Mar. 27, 2001

(54) PROCESS FOR TREATING WASTEWATER

(75) Inventor: George A. Moore, III, Leland, NC (US)

(73) Assignee: Achemco, Inc., Wilmington, NC (US)

( * ) Notice: Subject to any disclaimer, the term of this patent is extended or adjusted under 35 U.S.C. 154(b) by 0 days.

(21) Appl. No.: 09/413,330

(22) Filed: Oct. 12, 1999

Related U.S. Application Data

(63) Continuation-in-part of application No. 09/046,071, filed on Mar. 23, 1998, now abandoned.

(51) Int. Cl.[7] .............................. B01D 21/01; C02F 1/52
(52) U.S. Cl. ........................ 210/667; 210/716; 210/724; 210/903
(58) Field of Search ............................... 210/702, 716, 210/723, 724, 667, 754, 764, 903, 916

(56) References Cited

U.S. PATENT DOCUMENTS

| | | | |
|---|---|---|---|
| 3,408,288 | * | 10/1968 | Messa ................................ 210/724 |
| 4,167,479 | * | 9/1979 | Besik ................................. 210/610 |
| 5,271,848 | * | 12/1993 | Smith et al. ......................... 210/702 |
| 5,443,730 | * | 8/1995 | Letourneux et al. ................. 210/723 |
| 5,490,907 | * | 2/1996 | Weinwurm et al. .................. 210/664 |
| 6,030,537 | * | 2/2000 | Shaniuk et al. ...................... 210/683 |

FOREIGN PATENT DOCUMENTS

| | | | |
|---|---|---|---|
| 291543 A5 | * | 7/1991 | (DE) . |
| 49-63256 | * | 6/1974 | (JP) . |
| 51-93548 | * | 8/1976 | (JP) . |
| 57-65382 | * | 4/1982 | (JP) . |
| 10113674 | * | 5/1998 | (JP) . |

\* cited by examiner

*Primary Examiner*—David A. Simmons
*Assistant Examiner*—Frank M. Lawrence
(74) *Attorney, Agent, or Firm*—Coats & Bennett, PLLC

(57) ABSTRACT

The present invention entails a composition and process for treating wastewater. The composition is made up of calcium hydroxide, bauxite, and activated carbon. This composition is mixed and continuously fed into a reactor(s) containing wastewater. The composition facilitates the settling and treating of solids for disposal as well as reducing odors and improving the color and quality of the wastewater to make it suitable for subsequent discharge. Additionally, a polymer can be added to promote flocculation and the further settling of suspended solids. An oxidant, such as chlorine gas, may also be added. In the case of chlorine gas, it reacts with ammonia nitrogen to convert the same to hydrochloric acid, water, and elemental nitrogen. Further, the present invention entails a chemical composition provided for reacting with hydrocarbon compounds and breaking them down so as to render them non-toxic and non-hazardous. Basically the chemical composition is an organosilicon that is formed by mixing a carbon source, an alkyl alcohol, an organic salt and a silicon compound and thereafter adjusting the pH of the formed composition to a range of approximately 7–9 pH units.

23 Claims, 3 Drawing Sheets

PROCESS FOR TREATING WASTEWATER

CROSS REFERENCE TO RELATED APPLICATION

This is a continuation-in-part of U.S. patent application Ser. No. 09/046,071 filed Mar. 23, 1998, now abandoned.

FIELD OF THE INVENTION

The present invention relates to wastewater treatment and more particularly to a method for reducing the concentration of entrained solids, nitrogen, pathogens, and heavy metals; as well as killing bacteria, reducing the biological and chemical oxygen demands, reducing odors and generally improving the overall color and turbidity of the wastewater. In addition, the present invention relates to the chemical processing and decomposition of hydrocarbon compounds, and more particularly to a chemical composition and process for decomposing or encapsulating hydrocarbon based hazardous waste material.

BACKGROUND OF THE INVENTION

Wastewater treatment entails removing and treating many different types of pollutants or contaminants found in wastewater. There are, of course, many different types of processes that are aimed at treating wastewater to remove such contaminants and pollutants. Generally, the basic approaches revolve around biological and/or chemical treatment processes. While there has been significant progress made in developing new technology for treating wastewater, there still remains one serious concern that is especially felt by small towns and local governments all over the world. The thrust of the technology that has been developed today for treating wastewater is principally aimed at very large wastewater anaerobic and aerobic treatment facilities that require tremendous capital investment and space for retention compounds to facilitate digestion. These wastewater treatment systems and processes fall outside of the economic reach for many small local government bodies or small businesses that need or require their own wastewater treatment facilities. Therefore, there has been and continues to be a need for a cost effective wastewater treatment system that is affordable by small governmental bodies and others who have a need to treat and process wastewater. It is further recognized that some individuals need a system of a capacity or scale that is substantially below the size of the typical treatment plants normally designed for large municipalities.

Further, another deficiency of conventional wastewater treatment processes is that they often rely solely on aerobic or anaerobic digestion to remove contaminants and are not particularly designed to deal with a wide range of contaminants and pollutants typically found in wastewater streams. Therefore, there is also a need for a practical and cost-effective wastewater treatment process wherein the process effectively removes a wide range of pollutants and contaminants from the wastewater.

In addition, it is widely known that hydrocarbon based toxic and hazardous wastes are commonly produced as a consequence of numerous commercial and industrial processes. In some cases, this waste material may be difficult to contain at the point of generation, and as a result, this material may ultimately escape to the environment as a contaminant. Such contamination often poses serious environmental and health concerns, and consequently there arises the need to remove or neutralize this contamination.

One commonly employed process being used for treating low levels of hydrocarbon contamination is in situ bioaugmentation. In this process, genetically altered microorganisms are applied directly to the affected material where they proceed to digest the hydrocarbon contaminants. In the case of ground contamination, the effected soil is seeded with the micro-organisms and their digestion progress is continuously monitored. Although effective, treatments using this approach tend to be prolonged and may require extended treatment and monitoring periods, possibly lasting five to ten years before satisfactory results are obtained. Capital and operational costs for this process can be excessive.

Another common method of treating soil contaminated with hazardous hydrocarbon compounds involves the removal and off-site processing of the soil. The off-site processing typically includes baking the contaminated soil in a high temperature furnace or kiln so as to burn or combust the hydrocarbon contaminants and hence effectively remove them. This treatment approach, while not as slow as in situ bioaugmentation, tends to be extremely expensive as a consequence of the high transport and fuel costs associated with such processing. Soils treated via this process are often void of nutrients and beneficial bacteria, which negatively impacts soils reuse.

Still other equally expensive processes, which have been successfully employed to treat hydrocarbon-contaminated soil, involves in-situ exposure to highly oxidative reactants, such as hydrogen peroxide, in conjunction with lead and zinc bearing solutions. While effective in reducing the overall toxic hydrocarbon content of the contaminated soil, this type of treatment tends to attack or neutralize non-toxic organics which may also happen to be present in the soil. The use of strong oxidants can mobilize heavy metals if present in the soils and actually increase the danger to the public from them. In general, neutralization of non-toxic organics is undesirable and hence this approach is less than ideal in most instances.

Therefore, there is and continues to be a need for a practical and efficient technique for eliminating or neutralizing toxic hydrocarbon contaminants typically found in the environment which is fast acting, cost effective and which targets only the specific toxic hydrocarbons of concern.

SUMMARY OF THE INVENTION

The present invention relates to a chemical and mechanical method for treating municipal wastewater and basically entails chemical injection of a coagulant, a flocculent, and one or more oxidants to precipitate, flocculate, and separate solids and metals from suspension and solution within the wastewater. It further involves the reduction of pathogens by oxidation and elevated pH adjustments as well as the preparation of solids for disposal through vector attraction reduction by elevating the pH of the separated solids to 12 pH units. The process further involves removal of essentially all ammonia nitrogen via a combination of oxidation and ion exchange and subsequent chemical pH adjustment of the treated liquids to 8.5 pH units for discharge.

The process is dependent on a reagent comprised of mixing hydrated calcium hydroxide with bauxite and a carbon source to form the reagent. This reagent is directed into the wastewater stream and mixed with the wastewater therein and subsequently directed to a settling vessel for mechanical separation of the liquids and solids. It has been found that this reagent drives the pH of the wastewater to 12 pH units, causing the calcium carbonates and other metallic compounds within the wastewater/reagent solution to precipitate. As the solids settle within a retention vessel, the precipitating calcium products and settling bauxite create a coagulating effect with the entrained solids contained within the wastewater, causing the suspended solids to settle to the bottom of the retention vessel. This process causes the wastewater to be cleaned and purified of solids and metallic carbonate compounds, thus softening as well as cleansing the wastewater.

In addition, in one embodiment of the present process, it is contemplated that a flocculating agent in the form of a polymer can be added as an augmentation to the reagent just described. By introducing the polymer into the wastewater and mixing the polymer with the wastewater, flocs of the solids are formed and as the flocs accumulate and increase in size they tend to settle to the bottom of the reactor, thereby further cleaning or removing smaller particle solids from the wastewater.

Another option of the present invention deals with removing nitrogen compounds from the wastewater. Generally, nitrogen is reported as inorganic ammonia nitrogen as well as total Kjeldahl nitrogen (total organic and inorganic nitrogen). Other forms of nitrogen (inorganic) found in wastewater are nitrates and nitrites. The present invention entails raising the pH of the wastewater, removing the solids, and converting the remaining inorganic nitrogen contained in the liquid portion of the wastewater to $NH_3/NH_4-$ and oxidizing this ammonia with an oxidant. The oxidant converts the $NH_3/NH_4-$ to elemental insoluble nitrogen gas that is evolved from the system.

In one embodiment of the present process, the oxidant is in the form of chlorine. The chlorine is injected or dispersed into the wastewater and reacts with the ammonia to yield hydrochloric acid, water, and elemental nitrogen. Thus, the ammonia concentration is reduced in the wastewater. To reduce the nitrogen levels further, wastewater is passed through a zeolite bed and any remaining ammonia is removed from solution via ion exchange within the zeolite bed. Regeneration, or elution, of the ammonia saturated zeolite is accomplished with a sodium chloride brine solution, or other suitable reagents, which exchanges sodium ions for the ammonia ions adsorbed into the zeolite crystal lattice. The ammonia stripped from the zeolite is then removed from the brine solution via the application of heat and air in a remote vessel. The ammonia is then recovered and utilized for fertilizer application.

Also, the present invention entails a separate chemical composition for reacting with hydrocarbon compounds in such a fashion that the invention renders the hydrocarbon compounds non-toxic and non-hazardous. Basically, the chemical composition of the present invention is an organosilicon that is formulated by mixing both a silicon compound and a carbon source such as phenol or gluconic acid with water. In a specific formulation, the organosilicon is produced by mixing water, a carbon source, an alkyl alcohol, an organic salt and a silicon compound and, thereafter, adjusting the pH of the formed composition to a range of approximately 8–9 pH units with NaOH.

In one particular formulation, the organosilicon is produced by mixing chlorine distilled water with phenol. In particular, the phenol and water are mixed with an agitator or shearing pump for approximately one-half hour. Thereafter, isobutyl alcohol is mixed for approximately 30 minutes with the phenol and water mixture. Next, sodium chloride crystals are mixed for approximately 30 minutes with the water, phenol and isobutyl alcohol mixture. Finally, a silicon compound is mixed with the preexisting mixture for approximately 30 minutes. Thereafter, the pH of the organosilicon is adjusted to a range of approximately 8–9 pH units with NaOH.

The present invention provides a novel organosilicon compound and a method of preparing the same as well as a process for encapsulating hydrocarbon contaminates using the organosilicon compound. The highly anionic compound is made up of two main components. First, there is a non-polar polysiloxane chain base which is coupled to a second component, a pair of polar heads in the form of disassociated ions, generally, chloride and hydroxide anions and sodium cations.

When the organosilicon compound is mixed with or reacted with hydrocarbon contaminates, the polar head portions of the organosilicon, because of their highly negative charge, are pulled away from the structural make up of the organosilicon, thus causing the non-polar component to be zipped apart, effectively splitting the original organosilicon molecules therein that in turn effectively encapsulate hydrocarbon compounds. The resulting compositions are non-toxic and non-hazardous.

Other objects and advantages of the present invention will become apparent and obvious from a study of the following description and the accompanying drawings, which are merely illustrations of such invention.

DETAILED DESCRIPTION OF THE INVENTION

The present invention comprises several treatment and retention vessels and chemical injection systems that effectively separate the entrained solids from the liquid stream of the wastewater, treats the solids to a degree that makes them suitable for disposal without further treatment, reduces the biological and chemical oxygen demands of the liquid portion of the wastewater, and reduces the pathogen concentrations within the wastewater. The invention further clarifies the wastewater and removes objectionable odors as well as improves the general color of the wastewater. Further, the wastewater treatment composition and process removes or reduces volatile carbons, nitrogen, metallic carbonate compounds, and phosphorus in wastewater solutions.

In one embodiment of this invention, the required reagent composition can be formulated from calcium hydroxide [$Ca(OH)_2$], bauxite, and activated carbon. The calcium hydroxide originates in the form of limestone, $CaCO_3$. The limestone is processed to yield calcined calcium oxide (CaO) which is further processed to form a hydrated calcium oxide product typically containing 23–24% water. This hydrated calcium oxide product is commonly known as high calcium hydrated lime and is referred to herein as calcium hydroxide.

The bauxite is calcined at approximately 250° C. to form alumina ($Al_2O_3$) and sodium aluminate, $NaAlO_2$. The bauxite used in the reagent of the present invention typically comprises, by weight, approximately 88% alumina and 12% sodium aluminate.

The reagent composition of the present invention would typically comprise by weight approximately 80–99% calcium hydroxide, 0.5–10% bauxite, and 0.5–10% activated carbon. In one preferred formulation, the reagent would comprise by weight approximately 98% calcium hydroxide, 1% bauxite, and 1% activated carbon.

The calcium hydroxide, bauxite and activated carbon are mechanically mixed together to form the solid reagent composition.

To apply this reagent composition to wastewater, the reagent is formed into a saturated solution/slurry prior to application by adding water to the composition. By forming the composition into a slurry, it has been found that it is easier to control and meter the dispensing of the reagent composition into a wastewater treatment system.

The solid reagent formed by the calcium hydroxide, bauxite and activated carbon can be complemented in a wastewater treatment process with other chemicals or additives. For example, the use of a conventional cationic polymer will work in conjunction with the solid reagent to form flocs of suspended solids that will ultimately settle out and result in purifying and clarifying the wastewater. In addition, the use of an oxidant, such as chlorine, will augment the solid reagent by killing bacteria and oxidizing ammonia nitrogen compounds to hydrochloric acid, benign nitrogen gas and water.

Figure 3:
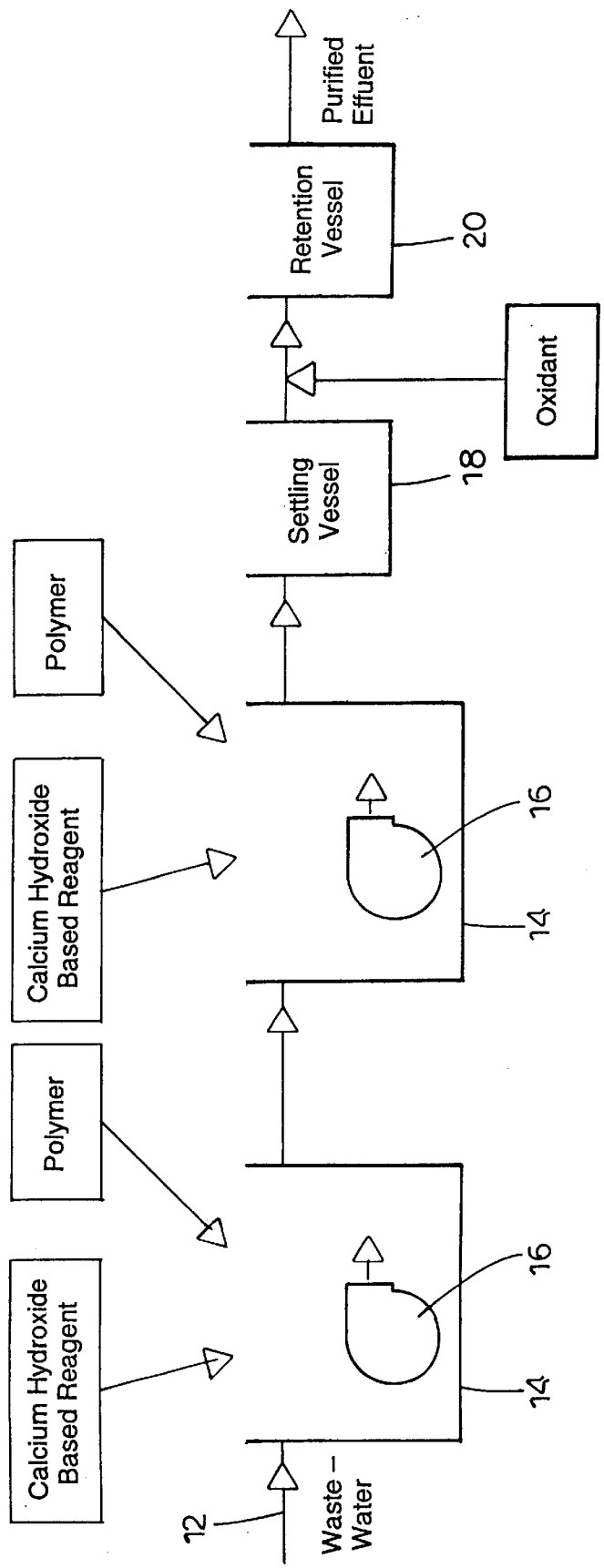
FIG. 3 is a schematic illustration of the wastewater treatment process of the present invention.

Turning to FIG. 3 there is shown therein a schematic illustration of a wastewater treatment process using the slurried calcium hydroxide based reagent just discussed. Note that wastewater enters an inlet line 12 and is continuously directed into and through one or more reactors 14. In this illustration, only two reactors are shown but it will be appreciated by those skilled in the art that one or more reactors may be employed. Each reactor is provided with a pump 16 for continuously mixing the wastewater and any reagents. The treated wastewater then passes into one or more settling vessels 18 in which solids separate from the liquids and are removed from the settling vessel via a pump and sent to a retention vessel 20 to await disposal. It should be appreciated that settling can take place in a reactor or a vessel dedicated to settling. The treated liquid stream is then oxidized, its pH is adjusted to approximately 8.5 pH units, and it is directed through an ion exchange vessel for further ammonia nitrogen removal.

In treating the wastewater, the slurry calcium hydroxide based reagent is continuously dispensed or directed into the wastewater stream. The pumps 16 continuously inject the slurried calcium hydroxide reagent into the wastewater stream in order to maintain a pH of 12.0 pH units or greater. The feed rate of the slurried calcium hydroxide reagent can be varied. It is contemplated that the feed rate should be such that the concentration of the calcium hydroxide based reagent would be maintained in the wastewater stream at approximately 250 ppm to 1,000 ppm. For a practical and cost effective application, it is contemplated that the calcium hydroxide composition could be fed at a rate that would yield a mixed wastewater concentration of approximately 475 ppm of reagent. This concentration will bring the wastewater pH to the 12.0 pH range. Organic nitrogen will convert to $NH_3/NH_4+$ at this pH. Calcium carbonates, phosphate compounds, and other metallic carbonate compounds precipitate, with the precipitant acting as a coagulant as it settles to the bottom of the reactor. Concentrations of bacteria and other pathogens are reduced at these high pH levels.

To facilitate the settling of these solids in the wastewater, a polymer could be added to the wastewater. The polymer would typically comprise adaptec acid and acrylamide etha- manenim. In any event, the polymer is or may be optionable, and when utilized is added separately, as illustrated in FIG. 3, from the calcium hydroxide based reagent. The polymer effectively causes the solids within the wastewater to form flocs and as the flocs are formed they increase in size and weight and accordingly settle to the bottom of the reactors 16, thereby contributing to the purification of the wastewater. The feed rate of the polymer can vary, but it is contemplated that the feed rate would typically be such that the concentration of the polymer within the wastewater would be approximately 2–14 ppm. In a preferred process it is contemplated that the feed rate of the polymer would be such that its concentration would be approximately 8 ppm.

Further, the process entails oxidizing the wastewater. Any number of oxidants may be used. However it is contemplated that a suitable oxidant would be chlorine gas due its ability to kill pathogens and oxidize nitrogen compounds. Once injected into the wastewater at sufficient levels, the chlorine gas would effectively convert the ammonia/nitrogen compounds to hydrochloric acid and elemental nitrogen, and as pointed out above would also be effective to kill bacteria and reduce the pathogen concentrations within the wastewater.

The process just described and illustrated in FIG. 3 is designed to be used in conjunction with a continuous flow of wastewater into and through the reactors 14. It is postulated that the calcium hydroxide component of the reagent functions by elevating the pH of the wastewater to the point that carbonates begin to precipitate and, in part at least, act as a coagulant and thus facilitate or induce the settling of solids from the wastewater.

It is also believed that the bauxite, because of its weight, contributes significantly to the speed of this settling process. In practice, the alumina is present in ore and it is the ore that is combined with the other components set forth above. In particular, alumina ore is commercially referred to as bauxite. Typically, the concentration of alumina will be approximately 55–65% by weight of the bauxite ore. However, other concentrations ranging from approximately 10–90% may be effective in certain cases.

The carbon source plays a role in reducing odors associated with the wastewater and improving the overall color of the wastewater.

In certain cases, diatomaceous earth may be substituted for the activated carbon component of the reagent. And as with the calcium hydroxide/bauxite/carbon based reagent, a polymer flocculent can be added to aid in the filtration of the liquid being treated.

In formulating the above reagent composition(s), it is contemplated that the quality of the reagent(s) slurry would be improved if all component materials would be reduced to a size that would pass through a 200 mesh screen in order to maximize particle surface area and thus efficiency. However, it should be pointed out that the solid reagent will have some effect even if the particle sizes are greater than the size that would pass through a 200 mesh screen.

The sodium hydroxide reagent(s) previously discussed are particularly useful in treating wastewater including both raw wastewater and sludge. Below is a table entitled Wastewater Treatment Results that depicts typical results from adding the previously discussed solid reagent(s) to wastewater.

WASTEWATER TREATMENT RESULTS

| TEST | pH | BOD | COD | TKN | NH3 | NO3 | PO4 | Cl— | TSS | OIL | Ca | Pb | Al | Si | Mo |
|---|---|---|---|---|---|---|---|---|---|---|---|---|---|---|---|
| UNTREATED | 6.4 | 134 | 201 | 41.7 | 20.2 | 2.28 | 49.1 | 39.1 | 340 | 60.6 | 81.6 | 0.03 | 4.48 | 13.30 | 0.005 |
| TREATED | 6.8 | <2.0 | 27.4 | 3.25 | 1.14 | 0.25 | 1.26 | 31.8 | 3.5 | <.01 | 0.88 | 0.01 | 0.29 | 7.18 | 0.005 |

| TEST | COLOR | TURBIDITY | TOXICITY | FECALS | TOTAL HPC |
|---|---|---|---|---|---|
| UNTREATED | 800 | 95 | | | |
| TREATED | 10 | 2.34 | 100% @ 90 | <2 | 9 |

From the foregoing specification and discussion, it is appreciated that the wastewater treatment process of the present invention is particularly suited for application in a relatively small wastewater treatment facility. In particular, the reactors can be relatively small and the associated infrastructure substantially less expensive than what is the norm in conventional municipal wastewater treatment plants. In addition, the process of the present invention entails chemicals that are cost effective and act to remove an array of pollutants and contaminants found in wastewater streams.

Figure 1:
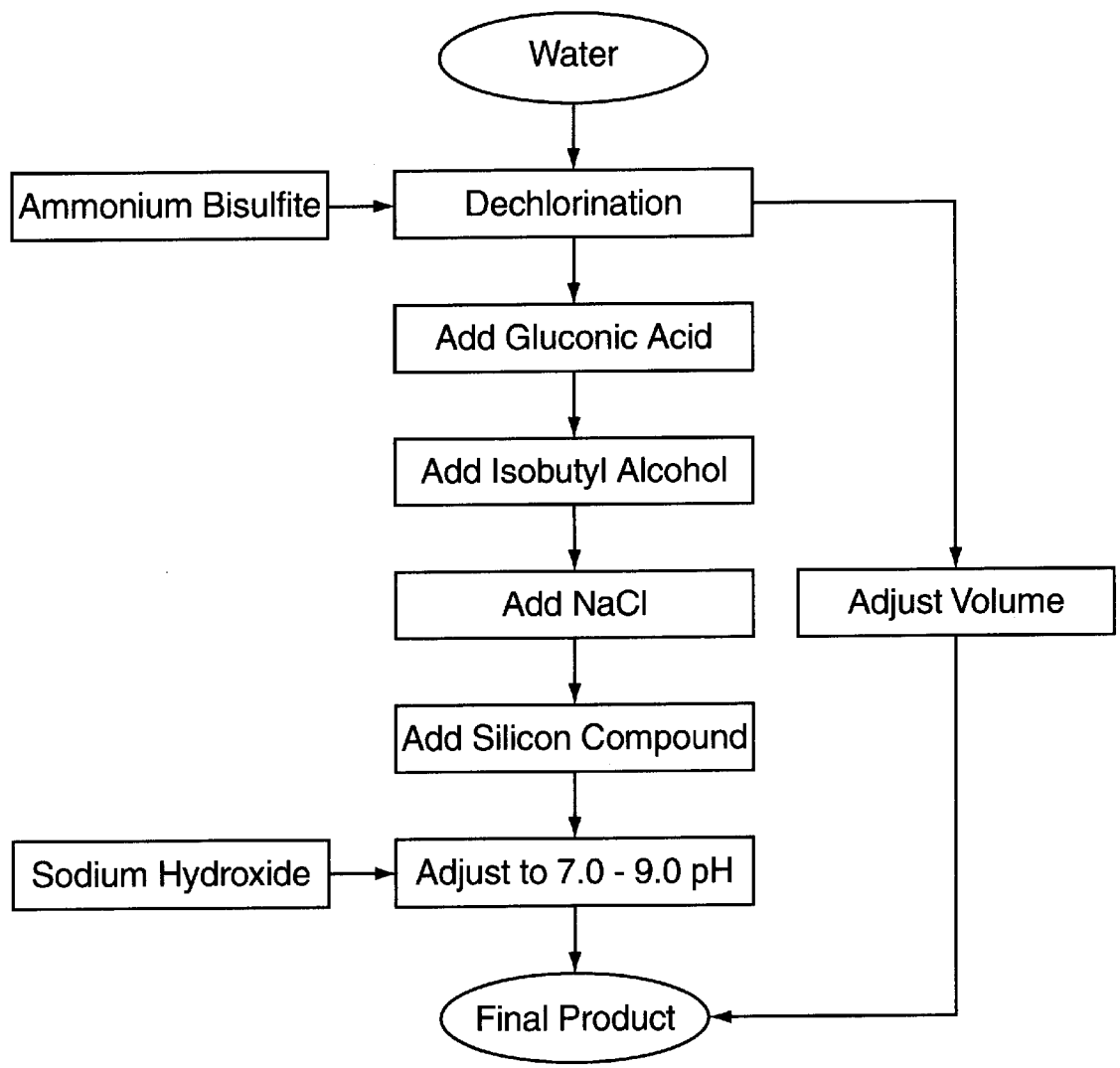
FIG. 1 is a schematic illustration of one process for formulating the chemical composition of the present invention.

Shown in FIG. 1 is a process for the preparation of the hydrocarbon encapsulating reagent of the present invention. In one preferred formulation of the present invention, 100 gallons of distilled water is added to a mixing tank. To the distilled water, there is added 600 gallons of gluconic acid. The gluconic acid is represented by $C_{12}H_{22}O_{12}$. It is also appreciated that the gluconic acid may be in the form of a gluconic acid salt such as calcium. In such case the gluconic acid salt would be characterized as Ca $(C_6H_{11}O_6)_2$. In any event, the gluconic acid is mixed with an agitator or shearing pump for approximately one-half hour at approximately 1,400–1,700 RPM. The density of the gluconic acid, in this example, is approximately 1.03 g/ml.

To the mixture of water and gluconic acid, there is added 200 gallons of isobutyl alcohol ($C_4H_{10}O$). The isobutyl alcohol in this formulation is mixed for approximately 30 minutes at 1,400–1,700 RPM.

Next, two pounds of sodium chloride crystals (NaCl) are mixed with the preexisting mixture for approximately 30 minutes. In this example, the sodium chloride crystals are pure or essentially pure.

Next, a silicon compound is mixed with the preexisting mixture for 30 minutes. The silicon compound in the example disclosed herein is in the form of 200 gallons of a silicon compound known as "LCS-12G" produced by Rhom-Haaus. The silicon compound includes, by weight, approximately 62% silicon, 3% phosphorus in the form of $PO_4$ and 35% carbon. After the silicon compound has been mixed, the pH of the resulting composition is adjusted to approximately 8–9 pH units by adding sodium hydroxide (NaOH). In a particular embodiment, the pH would be adjusted to a range of 8.2–8.5 pH units. Finally, in this example the entire volume of the formulated composition is adjusted to a volume of 1,000 gallons by adding distilled water.

Figure 2:
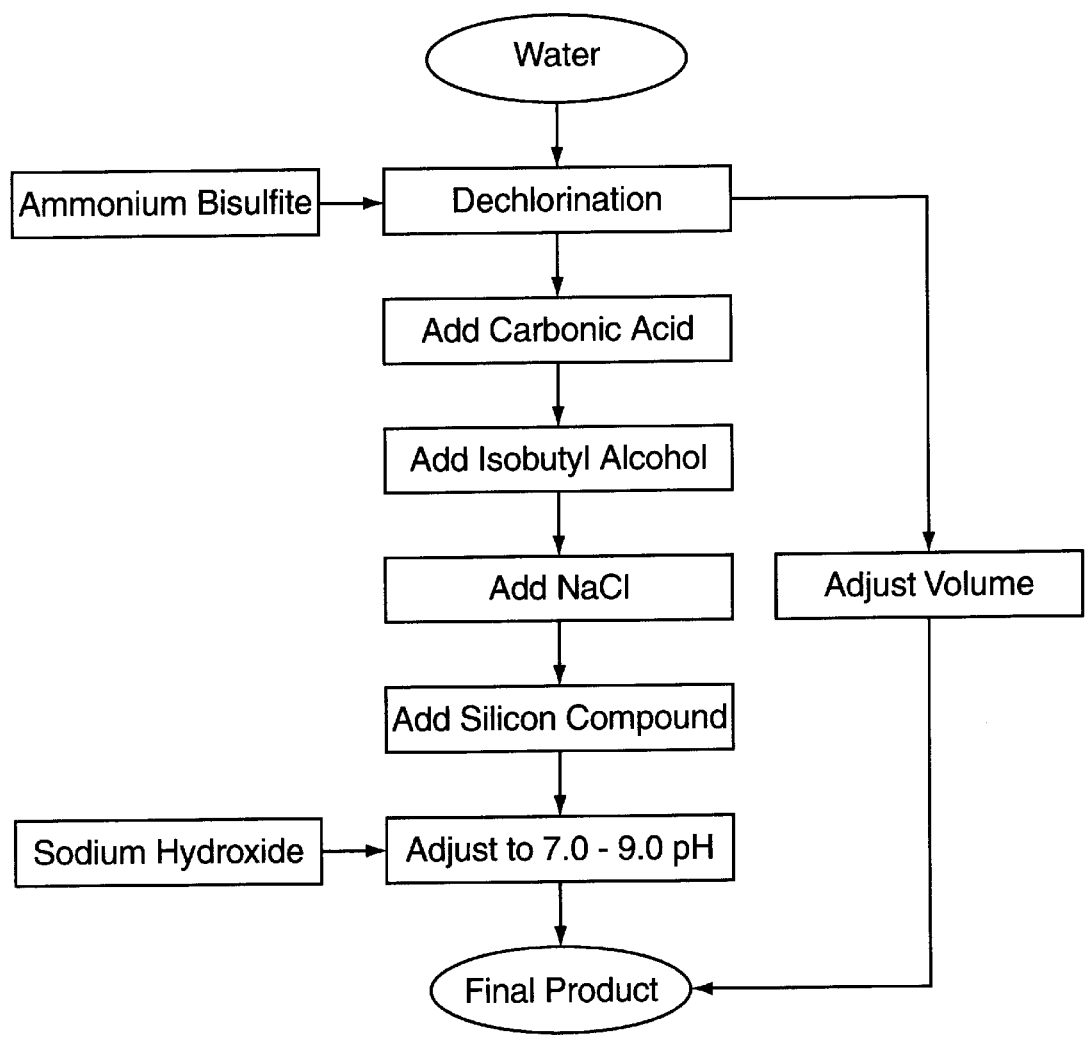
FIG. 2 is a schematic illustration of a second process for formulating the organosilicon composition of the present invention.

The above formulation is based on a process where a form of gluconic acid is provided as one of the components of the compound. In a second embodiment illustrated in FIG. 2, a form of phenol can be used in lieu of the gluconic acid. In this embodiment of the formulation, 100 gallons of distilled water is added to 250 gallons of phenol. The phenol can be in the form of $C_6H_5OH$. The density of the phenol in this example is approximately 1.35 g/ml. In any event, the phenol is mixed with the distilled water for approximately one-half hour.

Thereafter, 400 gallons of isobutyl alcohol ($C_4H_{10}O$) is mixed with the phenol and water mixture for approximately 30 minutes. The density of the isobutyl alcohol in this example is approximately 1.00 g/ml. Thereafter, as with the first formulation discussed, two pounds of sodium chloride crystals (NaCl) are mixed with the preexisting mixture for approximately 30 minutes. The concentration of the sodium chloride crystal is pure or essentially pure. Thereafter, as discussed in the preceding example, 200 gallons of a silicon compound (a product known as X-1000 produced by Rhom-Haaus) is added to the preexisting mixture. Again, the silicon compound of this example includes, by weight, approximately 62% silicon, 3% phosphorus as $PO_4$ and 35% carbon. The silicon compound is mixed with the preexisting mixture for approximately 30 minutes. Again the pH is adjusted to approximately 8–9 pH units and it has been found that a pH in the range of 8.2–8.5 pH units in some cases is preferred. Finally, the entire volume is adjusted to 1,000 gallons by adding distilled water.

The above formulations produce an organosilicon. Generally, the end composition will include, by weight, approximately 31% to 38% carbon and 27% to 47% silicon. In the end, the composition produced is an organosilicon that is identified by the chemical formula $C_{16}H_{33}O_{14}Si_6$ for the glunonic acid formulation and $C_{10}H_{17}O_3Si_6$ for the phenol formulation. These compositions are organosilicon compounds that include opposed polar head portions and a non-polar main body. The non-polar main body comprises a non-polar polysiloxane chain base which is coupled to the polar heads that generally include disassociated ions, generally, chloride and hydroxide anions and sodium cations. The polysiloxane base has a structure of the general formula $R_n(CH_3)_{22}Si_{11}(OH)_{11}NaCl_2$ where R represents an alkyl group and n is an integer from 1–20, and in a preferred embodiment, n is 11. In the presence of water, preferably distilled water, the sodium chloride and sodium hydroxide ion pairs are disassociated and solvated, thus creating the highly negatively charged polar ends of the compound.

Below, in Table 1 are the results of a test where the organosilicon of the present invention was tested on various contaminants ranging from arsenic to silver. As the table indicates, the organosilicon of the present invention reduced the concentrations of these various contaminants substantially.

TABLE 1

| Containment | Before Treatment (mg/l) | After Treatment (mg/l) |
| --- | --- | --- |
| Arsenic | 1.61 | <0.50 |
| Barium | 2.84 | 1.02 |
| Cadmium | 0.19 | <0.01 |
| Chromium | 45.1 | 0.66 |
| Lead | 6.06 | <0.10 |
| Mercury | <0.0001 | <0.0001 |
| Selenium | 9.32 | <0.60 |
| Silver | <0.01 | <0.01 |

The above contaminants were all present in a solution contained within a test vessel. For the test, the phenol version of the organosilicon was mixed with the contaminant and after thoroughly mixing, the levels of the contaminants were measured. In the case of the above test, approximately 1 gallon of the organosilicon produced according to the second formulation discussed above, that is the formulation including the phenol and shown in FIG. 2, was mixed with approximately a 15 gallon solution of the contaminants. Based on other studies, comparable results would be expected by using the organosilicon produced by the gluconic formulation shown in FIG. 1.

When applied to hazardous or toxic hydrocarbon compounds, the organosilicon reagent described above reacts with the hydrocarbon molecules causing the hydrocarbon molecule to be encapsulated.

The organosilicon reagent may be applied, for example, directly to the surface of contaminated soil, or may be injected below the soil surface. With particular regard to sub-surface injections, a liquid solution containing the organosilicon reagent would typically be injected into the ground via injection wells which are drilled prior to the start of treatment operations. Operating in concert with the injection wells are a series of hydraulically connected extraction wells which are located adjacent to the injection wells, where the extraction wells serve to remove or extract the reaction byproducts and any residual reagent solution. A solution containing the organosilicon reagent may also be sprayed directly onto contaminated surfaces, such as the floor or walls of an industrial facility. If the compound is reacted with exhaust stack gases, the organosilicon reagent may be used to effectively scrub hydrocarbon containing exhaust gases produced in a variety of industrial processes.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of treating wastewater in a reactor to generally remove solids and purify the wastewater comprising: mixing calcium hydroxide with bauxite and carbon to form a reagent; directing the mixed reagent into a reactor having wastewater therein; and mixing the reagent and the wastewater to cause the water to be purified and solids to generally settle.

2. The method of claim 1 wherein the mixed reagent comprises, by weight, approximately 80–99% calcium hydroxide, 0.5–10% bauxite and 0.5–10% carbon; and wherein the bauxite includes both alumina and sodium aluminate.

3. The method of claim 2 wherein the bauxite includes, by weight, approximately 78–98% alumina and approximately 2–22% sodium aluminant.

4. The method of claim 1 further including adding a flocculating agent in the form of a polymer to the wastewater and wherein the polymer causes suspended solids within the wastewater to form flocs and as the flocs accumulate in size they settle to the bottom of the reactor, thereby further acting to purify the wastewater.

5. The method of claim 4 further including the step of dispersing chlorine gas through the wastewater and wherein the chlorine gas reacts with ammonia nitrogen found in the wastewater and converts the ammonia nitrogen to elemental nitrogen.

6. A method of treating wastewater and removing suspended solids therefrom comprising:
   a. mixing hydrated calcium hydroxide with bauxite and a carbon source to form a calcium hydroxide based reagent;
   b. mixing the calcium hydroxide based reagent into a slurry;
   c. directing wastewater having suspended solids and other impurities therein into at least one reactor;
   d. continuously feeding the calcium hydroxide based slurry into the reactor and mixing the calcium hydroxide based slurry with the wastewater; and
   e. wherein the calcium hydroxide based reagent acts to combine with the suspended solids within the wastewater, causing the suspended solids to settle in the reactor so as to remove suspended solids from the wastewater and generally purify the wastewater.

7. The method of claim 6 further including adding a flocculating agent in the form of a polymer to the wastewater in the reactor and wherein the polymer gives rise to the suspended solids within the wastewater forming flocs that ultimately settle within a settling vessel connected to the reactor.

8. The method of claim 6 further including the step of dispersing chlorine gas into the wastewater such that the chlorine gas converts ammonia and nitrogen to hydrochloric acid and elemental nitrogen gas and wherein the chlorine gas further acts to kill bacteria and generally reduce the pathogen concentrations within the wastewater.

9. The method of claim 6 further including directing an oxidant into the wastewater downstream from the reactor.

10. The method of claim 6 wherein the carbon source constituent of the calcium hydroxide based reagent tends to reduce odors associated with the wastewater as well as improve the general color of the wastewater.

11. The method of claim 6 wherein the calcium hydroxide based reagent is fed into the reactor at a rate such that the concentration of the reagent within the wastewater is maintained within a range of approximately 250–1000 ppm.

12. The method of claim 6 wherein the calcium hydroxide based reagents are directed into the reactor at a rate such that the concentration of the reagent within the wastewater is maintained at approximately 475 ppm.

13. The method of claim 7 wherein the polymer is mixed with the wastewater such that the concentration of the polymer within the reactor is approximately 2–14 ppm.

14. The method of claim 6 wherein both the calcium oxide and the bauxite are calcined.

15. The method of claim 6 wherein the bauxite is calcined so as to form alumina and sodium aluminate.

16. The method of claim 6 wherein the calcium hydroxide acts, in part at least, as a coagulant and thusly promotes the settling of solids within the reactor.

17. The method of claim 16 wherein the bauxite effectively adds weight to the reagent and accordingly facilitates the settling of solids.

18. The method of claim 6 wherein the carbon source includes activated carbon.

19. The method of claim 6 wherein the mixed calcium hydroxide based reagent comprises, by weight, approximately 80–99% calcium hydroxide, 0.5–10% bauxite, and 0.5–10% carbon.

20. A method of treating wastewater by removing solids, reducing the concentration of pathogens, killing bacteria, removing ammonia and nitrogen, and removing odor and improving the general color of the wastewater comprising:
   a. mixing hydrated calcium hydroxide with bauxite and activated carbon to form a reagent;
   b. the reagent including, by weight, approximately 80–99% calcium hydroxide, 0.5–10% bauxite, and 0.5–10% activated carbon;
   c. forming the reagent into a slurry;
   d. feeding the formed slurry reagent into a reactor containing wastewater and continuously mixing the slurry reagent with the wastewater;
   e. introducing a flocculating agent in the form of a polymer into the wastewater, independently of the reagent, and mixing the polymer with the wastewater such that solids within the wastewater tend to form flocs and settle to the bottom of the reactor and thereby act to purify the wastewater; and
   f. introducing chlorine gas into the wastewater and mixing the chlorine gas with the wastewater such that the chlorine gas reacts with ammonia nitrogen found in the wastewater such that the chlorine gas effectively converts the ammonia and nitrogen to hydrochloric acid and elemental nitrogen.

21. The method of claim 20 wherein the bauxite is calcined to form alumina and sodium aluminate.

22. The method of claim 20 wherein the reagent is fed into the reactor at a rate such that the concentration of the reagent within the wastewater is maintained within a range of approximately 200–750 ppm.

23. The method of claim 22 wherein the polymer is mixed with the wastewater such that the concentration of the polymer within the reactor is approximately 2–14 ppm.

* * * * *